United States Patent [19]
O'Neil

[11] Patent Number: 5,514,865
[45] Date of Patent: May 7, 1996

[54] DITHER IMAGE SCANNER WITH COMPENSATION FOR INDIVIDUAL DETECTOR RESPONSE AND GAIN CORRECTION

[75] Inventor: William F. O'Neil, Ellicott City, Md.

[73] Assignee: Westinghouse Electric Corp., Pittsburgh, Pa.

[21] Appl. No.: 257,851

[22] Filed: Jun. 10, 1994

[51] Int. Cl.$^6$ ........................................ H01L 27/00
[52] U.S. Cl. ........................ 250/208.1; 250/214 AG; 358/474
[58] Field of Search ........................ 250/208.1, 234, 250/214 AG, 252.1; 358/445, 446, 452, 453, 462, 474; 360/77.17

[56] References Cited

U.S. PATENT DOCUMENTS

| | | | |
|---|---|---|---|
| 4,707,728 | 11/1987 | Hurst | 358/141 |
| 4,757,389 | 7/1989 | Clark et al. | 358/298 |
| 4,760,463 | 7/1988 | Nonoyama et al. | 358/455 |
| 4,902,893 | 2/1990 | Burrer | 250/334 |
| 5,276,319 | 1/1994 | Hepfer et al. | 250/208.1 |

Primary Examiner—Edward P. Westin
Assistant Examiner—Steven L. Nichols
Attorney, Agent, or Firm—C. O. Edwards

[57] ABSTRACT

A system for sensing images using a detector array and correcting errors in the image signals caused by gain and offset variations from detector to detector in the array is disclosed. To correct gain and offset errors, the detector array is dithered by moving the detector line of sight between consecutive frames according to a predetermined pattern. This dithering causes different detectors to image the same location in the scene during different frames, and causes two adjacent detectors to scan between the same two points in the scene during a cycle of the dither pattern. Image data generated from the dithering is used to remove gain and offset errors from the sensed images, and to generate gain and offset correction values to be stored in a table and applied to the sensed images. The system is also adapted to compensate for scene changes when the detector array is installed on a moving platform.

17 Claims, 7 Drawing Sheets

DITHER IMAGE SCANNER WITH COMPENSATION FOR INDIVIDUAL DETECTOR RESPONSE AND GAIN CORRECTION

BACKGROUND OF THE INVENTION

FIELD OF THE INVENTION

This invention relates to a system for sensing images using a two-dimensional detector array.

DISCUSSION OF RELATED ART

Sensors using two-dimensional detector arrays have been developed for both visible and infrared sensing of images. The detectors within these arrays exhibit variations in the current which flows in each detector when no light impinges on the detector. These current variations are referred to as dark current or offset. The detector arrays also exhibit variations in gain from detector to detector. These offset and gain variations corrupt the image from the detector array and limit the ultimate sensitivity in many applications. The errors caused by these variations increase the minimum detectable signal and thus have a detrimental effect on system performance. This effect is particularly damaging in the case of high performance, high sensitivity detector arrays.

Various solutions to this problem have been proposed. One proposal is to use a stored calibration method for calibrating the detector array. In this method, a precision radiation source blocks out all outside radiation and provides an adjustable level of radiation to different parts of the detector array. This radiation is measured repeatedly at different signal levels and averaged to reduce the errors due to temporal noise. The response of each detector in the array is determined, and a compensating error correction table is developed, which can be referenced by a hardware or software system controlling the detector array. The correction table may include correction values for correcting offset errors, gain errors, and linearity errors, which are typically polynomial variations of signal out versus signal in. These correction values are then used to correct the signals from the detectors during operation of the detector array.

Stored calibration methods, however, have several disadvantages. The optimum correction values to be used for correcting gain and offset vary with the temperature of the detector array. This variation limits the extent to which errors can be reduced using the stored values, because they cannot be changed without recalibrating the apparatus. Stored calibration methods also do not correct for variations in gain and offset from detector to detector as the sensor is used over a period of time. In addition, it is very difficult to make precise calibration sources whose radiant intensity is known to a sufficient degree of certainty. The calibration setups must also be located at a fixed location, and require a fairly sophisticated user for proper operation.

Another proposal involves application of known optical signal levels using shutters, mirrors, etc. to achieve a two point calibration during operation. This method involves exposing the array to one or two uniform radiation sources, and calculates correction values for each detector in the array based on the assumption that all detectors should exhibit equal signals when exposed to an equal intensity of radiation. In order to correct all samples of the scene, including samples at different signal levels, the detectors are assumed to be linear devices, and it is assumed that correcting detector gain and offset at one exposure level corrects the detector at all other levels.

This method suffers from several problems. For example, the uniformity of the sources is difficult to achieve and maintain, and the process of exposing the array to the sources introduces mechanical and optical complexity. In addition, the linearity assumption is frequently not valid with sufficient accuracy. High performance systems are required to operate over a wide range of signals relative to noise (e.g. maximum signal of 1,000 to 10,000 times root mean square noise), and thus the linearity assumptions must have comparable accuracy for these correction schemes to be effectively used. This is typically not the case.

A further proposal involves defocusing of the optics to achieve a "scene average" level for correcting offset. At this scene average level, all the errors for each detector, including both gain and offset errors, are lumped into a single "scene average offset error". This error is then corrected at the average signal present in the scene, and the corrections are stored in an offset table. This method can be used when the average level is very large compared to the changes in scene level signals from detector to detector used to create the picture. This method works better for infrared sensing apparatus than for visible light sensing apparatus, in an infrared apparatus, scene contrast is typically 1%. This scene average offset method may be combined with the use of a gain correction table set by calibration at the factory, for correction of both gain and offset.

Because this method uses a factory gain correction table for gain correction, however, it suffers from the same problems as the stored calibration methods described above. In addition, this method is not sufficiently accurate for visible light detectors or for more stressing infrared scenes.

Another involves application of a pulsed light source for compensation of gain variations among detectors. This method can be used to generate a gain correction table in the field. In this method, the sensor apparatus includes a light source (such as a laser diode) that illuminates all the detectors in the array at a speed much greater than the rate of changes in the scene. The part of the signal related to this light source is then extracted and used to calculate the gain of each detector. One problem with this method, however, is that it is very difficult to ensure that the brightness of the light source is uniform. Thus, the system cannot compensate for errors within the light source itself, reducing the accuracy of the gain corrections obtained.

Signal processing methods for correcting gain and offset variations from detector to detector depending on statistical properties of the scenes have also been proposed, but none of these are known to have been implemented. The main problem with these methods is that once the signals have been obtained from the detectors, it is very difficult to separate out the part of the signal representing characteristics of the scene from the part of the signal caused by the characteristics of the detector.

In light of the foregoing, there is a need for a system which will compensate for the variations in offset and gain from detector to detector within a detector array in order to reduce the minimum signal which is detectable by the array and to improve overall system performance, without the problems inherent in the above-described methods.

SUMMARY OF THE INVENTION

Accordingly, the present invention is directed to a dither scanning apparatus and method that substantially obviates one or more of the limitations and disadvantages of the related art.

To achieve these and other objects and advantages and in accordance with the purpose of the invention, as embodied and broadly described herein, the invention comprises a dither scan detector compensation apparatus comprising means for sensing images in a scene using an array of individual detectors and generating output signals from the detectors corresponding to portions of the scene observed, means for dithering the sensing means according to a dither pattern, the dither pattern allowing for detector overlap and common scan paths, and means for correcting gain and offset errors in the output signals from the individual detectors resulting from variations in gain and offset from detector to detector in the detector array based on signals resulting from the detector overlap and the common scan paths provided by the dither pattern.

It is to be understood that both the foregoing general description and the following detailed description are exemplary and explanatory and are intended to provide further explanation of the invention as claimed.

The accompanying drawings, which are incorporated in and constitute a part of this specification, illustrate an embodiment of the invention and together with the description serve to explain the principles of the invention.

DETAILED DESCRIPTION OF THE PREFERRED EMBODIMENT

Reference will now be made in detail to the present preferred embodiment of the invention, an example of which is illustrated in the accompanying drawings.

Figure 1:
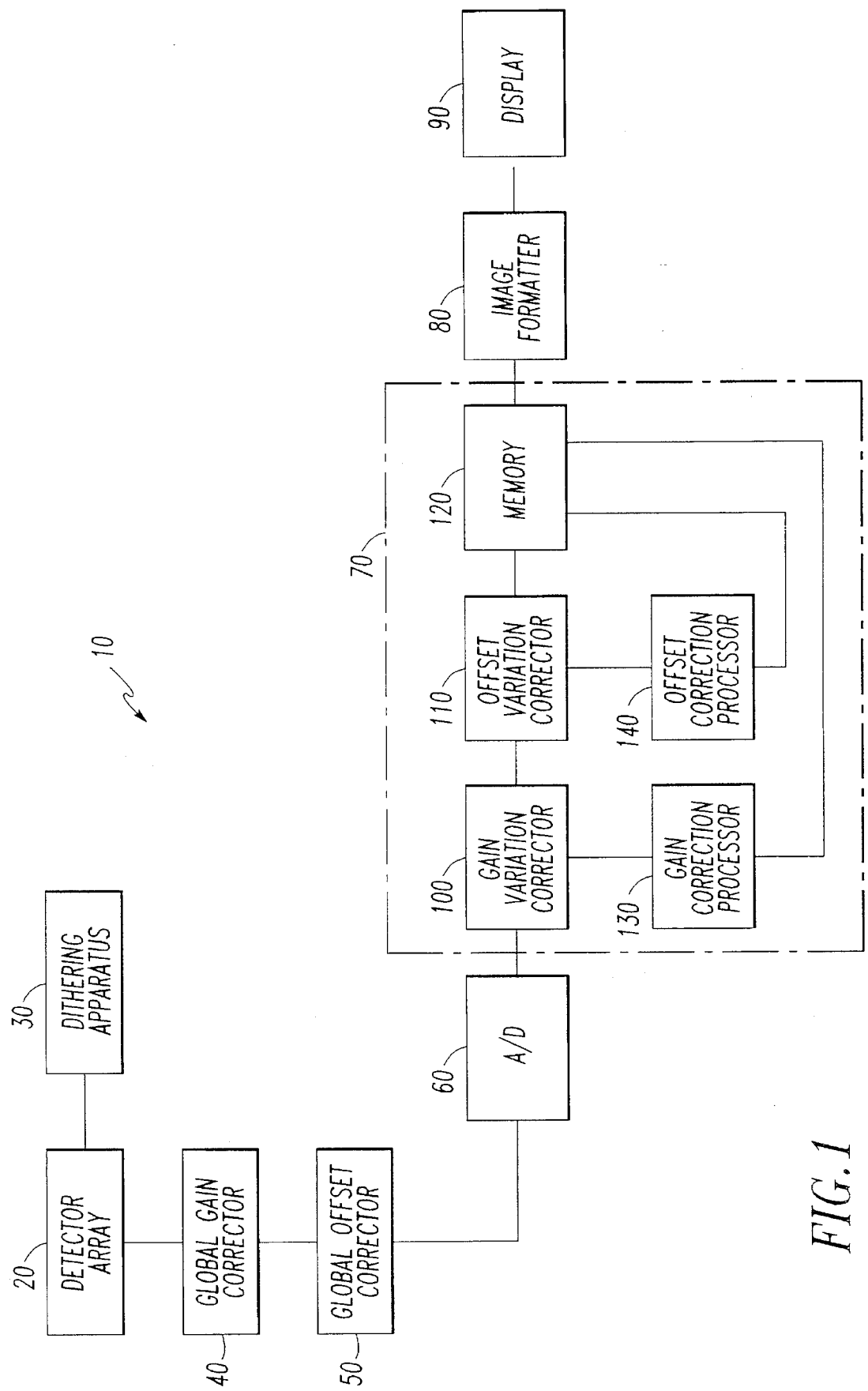
FIG. 1 is a general block diagram of the preferred embodiment of the dither scan detector compensation apparatus of the invention.

FIG. 1 is a general block diagram of the preferred embodiment of the dither scan detector compensation apparatus 10 of the invention. The apparatus 10 includes detector array means for sensing images in a scene, which in the preferred embodiment is shown by detector array 20 for sensing images in a scene and generating output signals corresponding to the portions of the scene observed. Apparatus 10 also includes means for dithering the detector array means, which in the preferred embodiment is shown by dithering apparatus 30. Dithering the detector array consists of moving the detector line of sight between consecutive frames, according to a predetermined dither pattern. The dithering apparatus can move the detector line of sight in a number of different ways. One method is by moving an optical element that focuses radiation on the detector array. This optical element can either be moved laterally or tilted. Further approaches are to use a rotating thin flat transmissive element to displace the line of sight, or a rotating wedge-shaped transmissive element to deflect the line of sight. A variety of other dithering apparatus can be used to dither the detector array. In the preferred embodiment, the dither pattern is selected so that different detectors will image the same location of the scene in different frames and that two adjacent detectors will scan between the same two points in the scene during a cycle through the dither pattern.

Apparatus 10 also includes global gain corrector 40 and global offset corrector 50 for correcting global gain and offset errors common to all detectors in the detector array, as well as analog to digital converter 60 for digitizing the detector signals.

Apparatus 10 further includes means for correcting gain and offset errors resulting from variations in gain and offset from detector to detector in the array. In the preferred embodiment, this means is shown as processing hardware 70, which processes the output signals from detector array 20 and corrects variations in the gain and offset of each detector in the array. Processing hardware 70 can be implemented using a video processing unit (VPU), memory, and software. Image formatter 80 receives detector data from processing hardware 70 and converts it to a proper format for displaying on display 90.

Processing hardware 70 includes means for correcting gain errors resulting from variations in gain from detector to detector in the array, shown by gain variation corrector 100 and gain correction processor 130. During the tracing of the dither pattern, two or more detectors will traverse the same path between the same two points in the scene. The difference in intensity between these two points is referred to as the scan gradient. Gain corrections are determined from the difference in the scan gradients of these two common points of the scene scanned by different detectors.

Processing hardware 70 also includes means for correcting offset errors resulting from variations in offset from detector to detector in the array, shown by offset corrector 110 and offset correction processor 140. During the tracing of the dither pattern, a plurality of detectors will image the same point of the scene. This phenomenon is referred to as detector overlaying. Because they all image the same point, the intensity sensed by these detectors should be the same. Thus, offset corrections are determined by measuring the difference in intensity of a point sensed by two or more different detectors (detector overlaying).

Memory 120 within processing hardware 70 stores the corrected data for each detector after gain and offset correction by gain variation corrector 100 and offset variation corrector 110. The corrected data in memory 120 is used by gain correction processor 130 and offset correction processor 140 to calculate gain and offset correction factors to be applied by the gain and offset variation correctors 100 and 110. The data in memory 120 is also output to image formatter 80.

Figure 2:
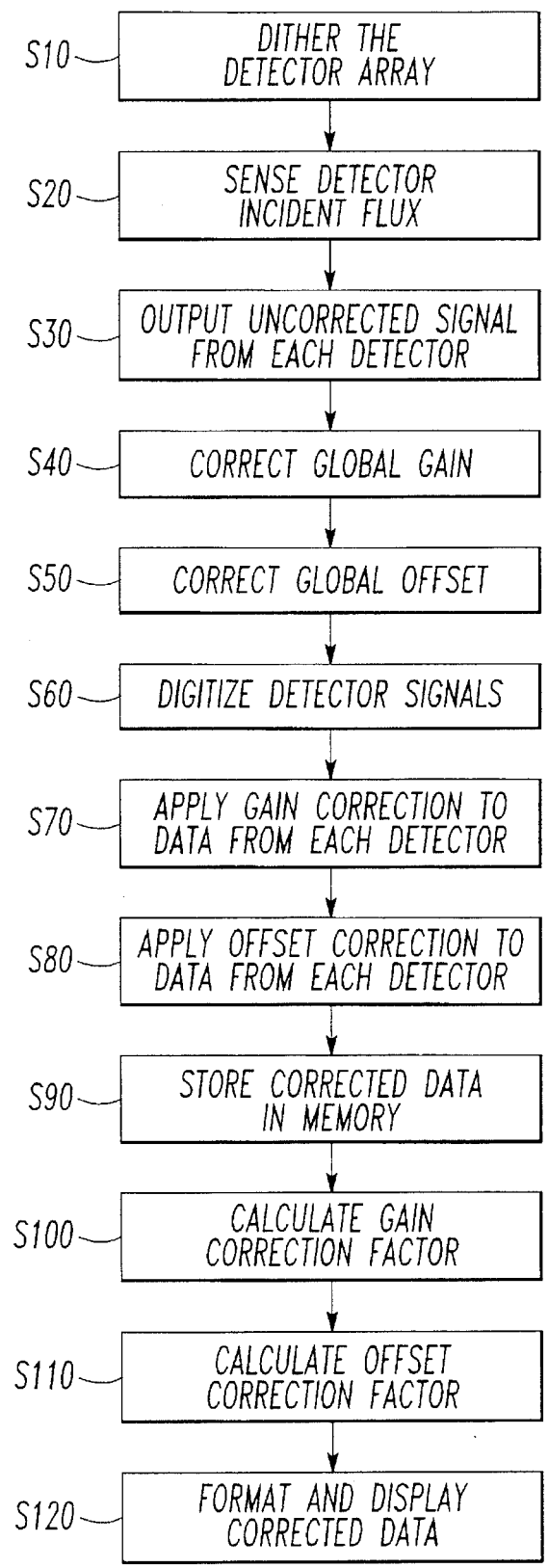
FIG. 2 is a flow chart that depicts the dither scan method of the preferred embodiment of the invention.

The operation of the preferred embodiment of the dither scan apparatus of FIG. 1 will be described in conjunction with the flow chart of FIG. 2, which depicts the dither scan method of the preferred embodiment of the invention. In step S10, the detector array is dithered by displacing it by one detector spacing in the vertical direction, horizontal direction, or both. Then, in step S20, each detector of the detector array 20 (FIG. 1) senses the incident flux from the scene during one frame. Steps S10 and S20 are repeated such that the dithering of the detector array traces a predetermined pattern. In step S30, an uncorrected signal is output from each detector indicating the intensity of the scene detected by that detector. In step S40, the global gain corrector 40 corrects the gain errors common to all detectors in the detector array. In step S50, the global offset corrector 50 corrects the offset errors common to all detectors in the detector array. In step S60, the A/D converter 60 converts the analog detector signals into digital data.

Next, in step S70, the gain variation corrector 100 applies a previously calculated gain correction factor for each detector to the data for each detector. In step S80, the offset variation corrector 110 applies a previously calculated offset correction factor for each detector to the data for each detector. Then, after the gain and offset correction has been applied to the data for each detector, the corrected data is stored in memory 120 in step S90. Then, in step S100, the gain correction processor 130 uses the corrected detector data stored in memory 120 to calculate the gain correction factors for each detector to applied by the gain variation corrector 100 to the next set of detector data. In step S110, the offset correction processor uses the corrected data stored in memory 120 to calculate the offset correction factors for each detector to be applied by the offset variation corrector 110 to the next set of detector data. Finally, in step S120, the corrected detector data is output from memory 120 to image formatter 80, which places the data in proper display format for display 90. The theoretical basis of the dither scan method and apparatus and the general equations which govern its operation will be described below. The uncorrected signal produced by each detector can written as $$S_d = (V_s * (G_{ave} + G_{error}) + V_{Offset} + V_{noise}) \quad (1)$$

where:
$S_d$ is the detector signal
$V_s$ is the scene intensity value
$G_{ave}$ is the global gain of the detectors
$G_{error}$ is the detector gain error
$V_{Offset}$ is the detector offset signal
$V_{noise}$ is the detector noise signal
The desired error free detector signal $S_{ideal}$ is just the first term in equation (1):

$$S_{ideal} = V_s * G_{ave} \quad (2)$$

For each detector, the total error signal $S_{error}$ from equation (1) is:

$$S_{error} = (V_s * G_{error}) + V_{Offset} + V_{noise}) \quad (3)$$

Normally, it can be assumed that $V_{noise}$ has the same statistical properties for every detector. Since this noise is a zero mean process with known statistics, it can be reduced by effectively averaging it over time. If the signal to noise ratio is relatively large, the noise term can be eliminated without greatly disrupting the accuracy of the error estimate. The reformulated error signal would then be:

$$S_{error} = (V_s * G_{error}) + V_{Offset} \quad (4)$$

In order to correct these errors, the dither scan procedure will dither the detector array between consecutive frames such that adjacent detectors image the same point in the scene at different times (detector overlaying) and that adjacent detectors traverse the same path between the same two points at different times (common scan paths).

When two different detectors are overlaid, the signals from each detector should be equal:

$$S_x(1,m) = S_y(1,m) \quad (5)$$

When two different detectors traverse the same path, the gradients should be equal.

$$S_x(1,m) - S_x(1,m+1) = S_y(1,m) - S_y(1,m+1) \quad (6)$$

$$|S_{gradx}| = |S_{grady}| \quad (7)$$

In the preceding two equations, x and y represent different detectors and 1 and m represent different scene locations. The magnitude notation in equation (7) is used to account for the fact that the order in which detector x visits the two points may be the inverse of the order in which detector y visits the same two points.

Equation (5) has error components due to individual detector offset errors as well as gain errors, while in equations (6) and (7), the offset errors cancel, leaving only gain errors. Therefore, the gain corrections are determined first from equations (6) and (7) and then applied to equation (5) so that it will only have offset errors.

The ratio of gradients is used as the gain correction term. Thus, for each set of detectors having common scan paths:

$$Ratio_{xy} = |S_{gradx}|/|S_{grady}| \quad (8)$$

If, instead of using only one different detector (y), N different detectors (denoted x1–xN) are used to estimate the correct gain, the correction term would be:

$$Ratio_x = (Ratiox_{x1} + Ratio_{x2} + \ldots + Ratio_{xN})/N \quad (9)$$

This correction factor is stored in a gain correction table and applied to the previous detector gain as a multiplying factor:

$$Gain_x = Ratio_x * Gain_x \quad (10)$$

During each succeeding cycle, the gain derived from the preceding cycle is applied to the data before the detector signal $S_x$ is measured. For each detector, gain errors relative to its neighbors will be progressively reduced, and the ratios will converge to unity. In order to increase stability, the gain correction loop may be modified as follows:

$$Gain_x = Ratio_x * Gain_x/(1+A) \quad (11)$$

where A >0 is required to preserve gain loop stability in the presence of noise and roundoff errors. The gain loop "time constant" in cycles is proportional to (1+A).

After the gain ratios have been estimated, the measured detector signals can be manipulated to obtain detector offset differences. For two detectors viewing the same location in the scene, the signals are:

$$S_x = V_s^* G_x + V_{Offset} + V_{noisex} \quad (20)$$

and $$S_y = V_s^* G_y + V_{Offset} + V_{noisey} \quad (30)$$

As before, if the signal to noise ratio is large, the noise term can be effectively disregarded. Using subscript x as the detector to be corrected, the signals from each y neighbor can be modified by dividing by Ratio$_{xy}$. The result is:

$$S_y' = S_y/\text{Ratio}_{xy} = V_s^* G_x + V_{Offset}/\text{Ratio}_{xy} \quad (70)$$

The difference between the modified neighbor and the detector to be corrected is:

$$\text{Diff}_{xy} = S_x - S_y' = V_{Offset}/\text{Ratio}_{xy} \quad (100)$$

The result is an estimate of the difference in offset between the detector and a scaled representation of its neighbor. In the limit, the ratios will be unity and the signal difference will be equal to the offset difference. Since the detector can be paired with N other detectors, the estimates can be averaged to achieve $N^{1/2}$ improvement in the offset.

$$\text{Diff}_x = S_x - (S_1' + S_2' + \ldots + S_N')/N \quad (110)$$

or $$\text{Diff}_x = V_{Offsetx} - (V_{Offset1}/\text{Ratio}_{x1} + V_{Offset2}/\text{Ratio}_{x2} + \ldots + V_{OffsetN}/\text{Ratio}_{xN})/N \quad (17)$$

This latter form is presented only to emphasize that the solution is relative to the local neighborhood average offset. The effect of subtracting Diff$_x$ from S$_x$ is to provide, for each detector, a consistent set of offset estimates that will result in no offset differences between detectors. However, all of the detectors may share a common offset which will not be detected by the proposed algorithms.

The implementation of the offset algorithm is similar to the gain algorithm, in that Diff$_x$ is accumulated in an offset correction table, and removed from S$_x$ in the ensuing cycle. Thus, full correction is achieved when the observed S$_x$ and S$_y$ differences are zero with the ratios equal to unity. As before, the requirements for loop stability may require that on each cycle only a partial correction be implemented:

$$\text{Offset}_i = \text{Offset}_i + \text{Diff}_i/(1+B) \quad (18)$$

Figure 3:
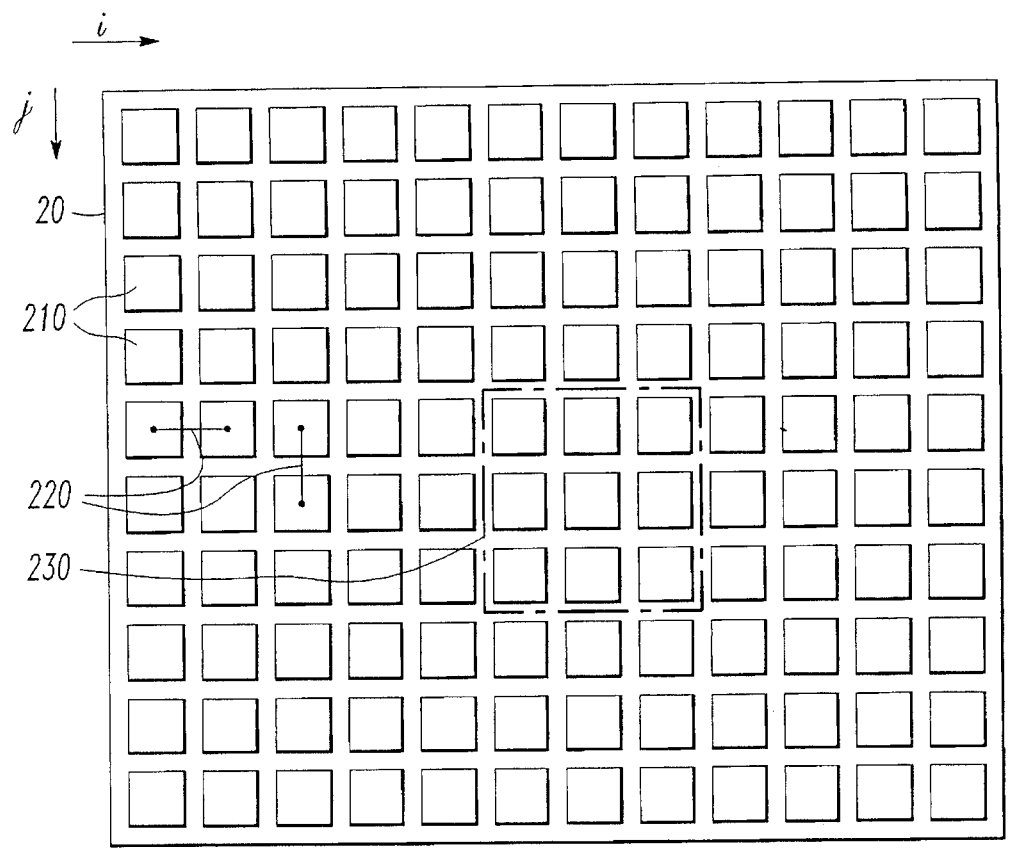
FIG. 3 is a detector array used in the preferred embodiment of the invention.

The structure of the dither scan detector apparatus illustrated in FIG. 1 will next be described in more detail below. FIG. 3 illustrates a detector array 20 used in the preferred embodiment of the invention. This array can be designed to detect either visible light or infrared radiation, and can be used in a variety of applications such as missile seeking, video recording, commercial aircraft landing, and law enforcement. The size of the detector array and number of individual detectors used can vary depending upon the type of array (visible or infrared) and the application. For example, visible light arrays can be as large as 1000×2000 individual detectors (2 million detectors), or larger, on a single silicon chip. Infrared light arrays are generally smaller, and can be constructed to be 64×64, 128×128, 240×320, or 480×640 individual detectors, for example. The detector array can also be constructed in many other sizes without departing from the scope of the invention. For visible light sensors, individual detectors 210 may be silicon photodiodes connected to a charge-coupled readout device. For infrared sensors, individual detectors 210 may be diodes formed of platinum silicide, indium anteminide, or mercury cadmium telluride. The use of high performance infrared sensors, such as indium anteminide and mercury cadmium telluride which have very high sensitivity and dynamic range, is where the errors caused by gain and offset variations in individual detectors are most critical, and it is these detector systems that benefit most from the dither scan method of the invention. These examples are not meant to be limiting, and a variety of other types of detectors may be used as well.

It is also preferred that each individual detector 210 be smaller in length and width than the spacing between detectors 220, resulting in a detector fill factor of less than unity. A detector fill factor of less than unity is a common characteristic of detector arrays in order to provide for detector isolation, readout, or other requirements imposed by specific design approaches. In the detector array 20, 'i' is designated as the horizontal coordinate and 'j' is designated as the vertical component. The detectors typically produce output analog signals corresponding to the portion of the scene that they observe. Detector array portion 230 is a 3×3 portion of the array which will be used in conjunction with FIGS. 5–8 to describe the dither scan operation in more detail.

Figure 4:
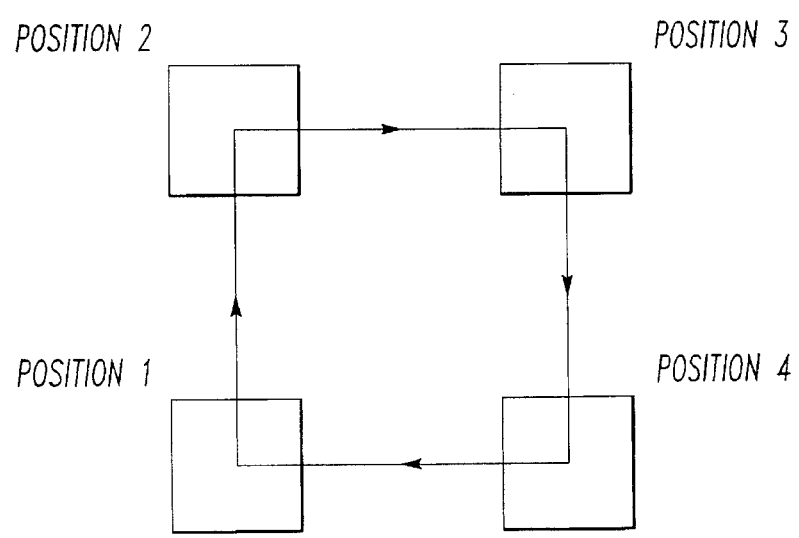
FIG. 4 is a box scan dither pattern used in the preferred embodiment of the invention.

FIG. 4 illustrates the box scan dither pattern which is employed in the preferred embodiment of the invention. In the box scan pattern shown in FIG. 4, the array begins at position 1, and during the first frame detects the incident flux received by each detector. At the end of the first frame, the array line of sight is dithered (moved) to position 2, at which the incident flux is detected during the second frame. After the second frame, the array is then dithered to position 3 for the third frame, and then to position 4 for the fourth frame. The array is then dithered back to position 1 to complete one cycle of the box scan dither pattern. The pamtern is then repeated again by dithering the array through the same four positions and measuring the incident flux at each position during one frame. As will be described below, this pattern provides for detector overlay and provides common scan paths for scan gradient determinations. It is important to note that the present invention is not limited to the box scan pattern, but rather may be used with other patterns which allow for detector overlay and provide common scan paths.

Figure 5:
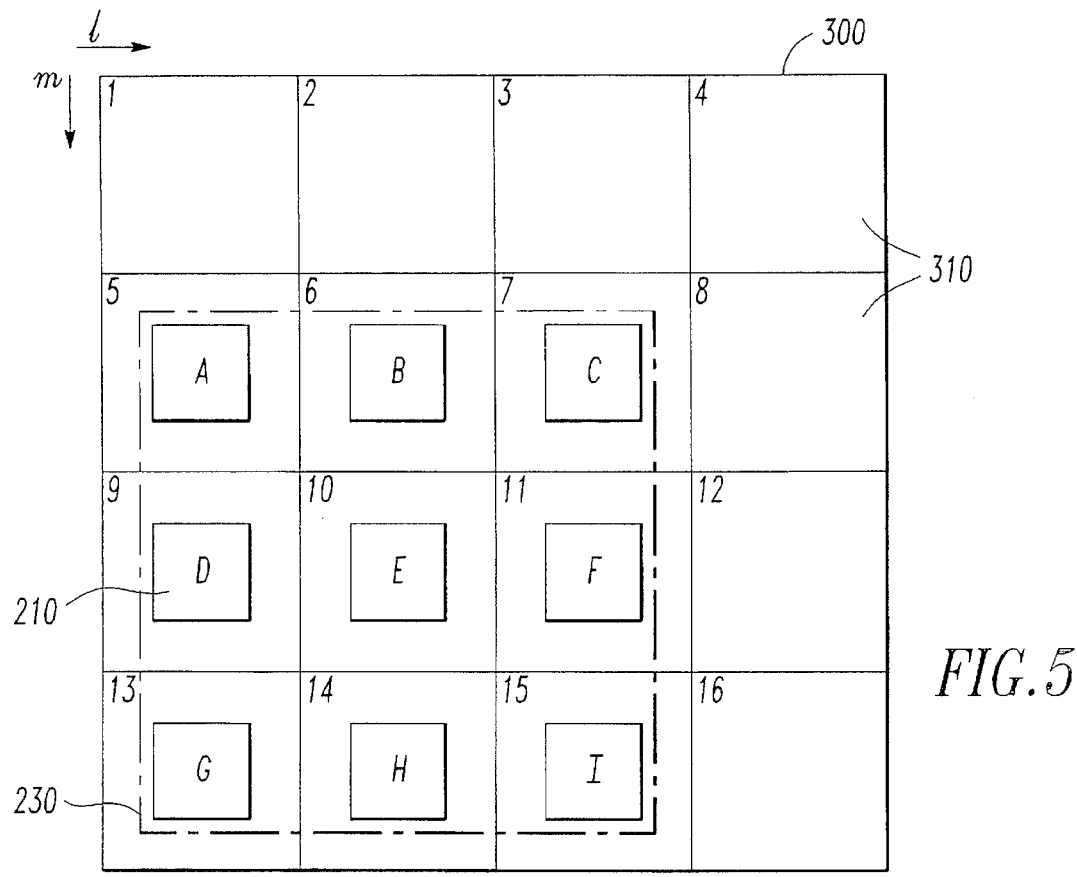
FIG. 5 shows a 3×3 portion of the detector array at position 1 of the box scan pattern of FIG. 4, used to illustrate in more detail the dither scan operation and the detector overlap and common scan gradients provided by the dither scan operation.

FIGS. 5–8 illustrate in more detail the dither scan operation and the detector overlap and common scan gradients provided by the dither scan operation. These figures show the dithering of the 3×3 detector array portion 230 shown in FIG. 3 according to the box scan dither pattern of FIG. 4. FIG. 5 shows the 3×3 detector array portion 230 at position 1 of the box scan pattern of FIG. 4. The detector array portion 230 has 9 individual detectors 210 labeled A through I. A portion of the scene imaged by the detector array is shown by reference numeral 30, and is divided into sixteen sections 310 labeled 1 through 16, each of which are detected by one of the individual detectors 210. During the first frame, at position 1 of the scan pattern, detectors A–C detect scene portions 5–7, detectors D–F detect scene portions 9–11, and detectors G–I detect scene portions 13–15.

Figure 6:
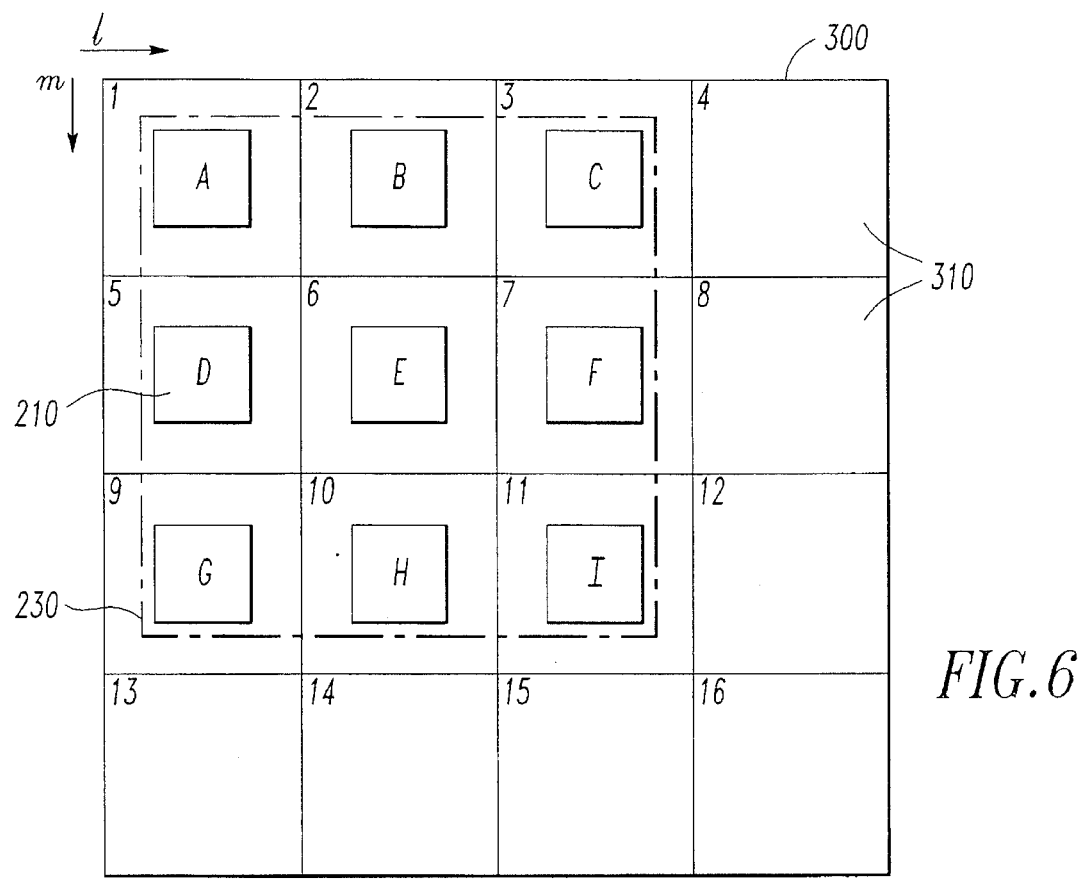
FIG. 6 shows the 3×3 detector array portion of FIG. 5 dithered to position 2 of the box scan pattern after the end of the first frame.

FIG. 6 shows the detector array portion 230 dithered to position 2 of the box scan pattern after the end of the first frame. During the second frame, detectors A–C detect scene portions 1–3, detectors D–F detect scene portions 5–7, and detectors G–I detect scene portions 9–11.

Figure 7:
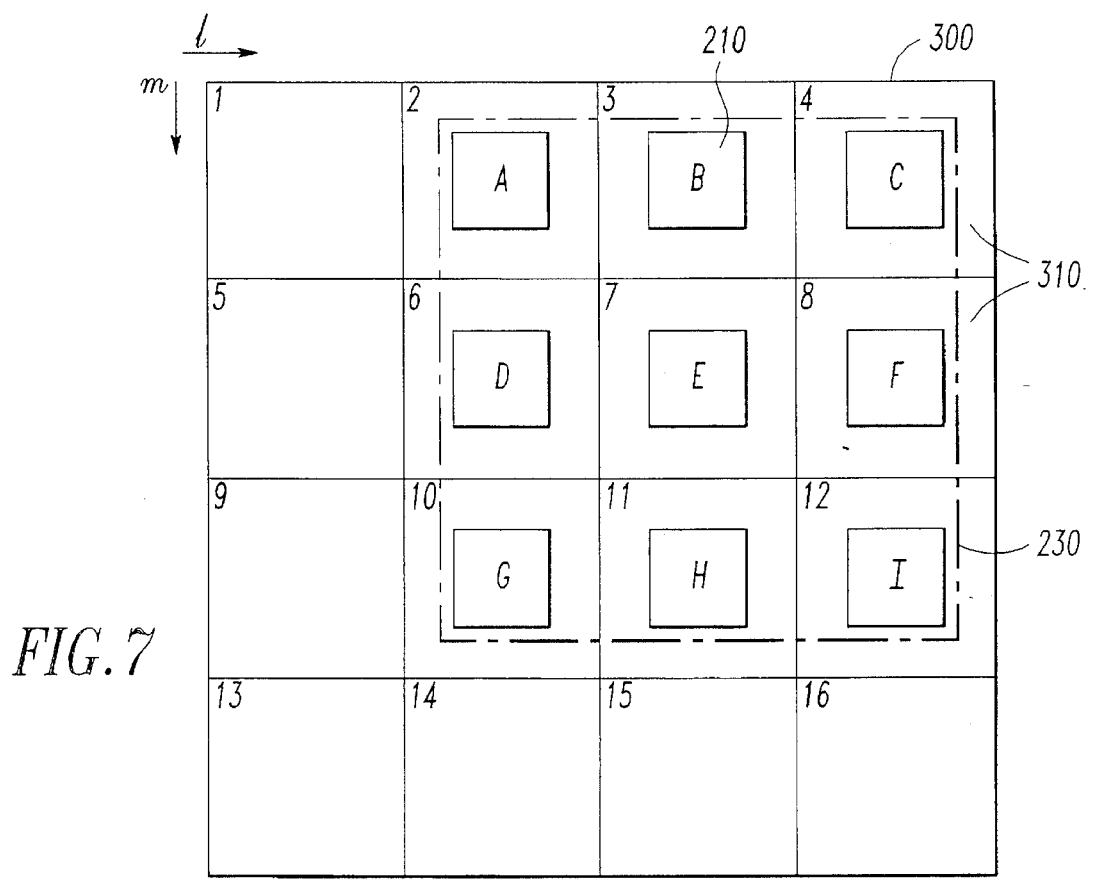
FIG. 7 shows the 3×3 detector array portion dithered to position 3 of the box scan pattern after the end of the second frame.

FIG. 7 shows the detector array portion 230 dithered to position 3 of the box scan pattern after the end of the second frame. During tile third frame, detectors A–C detect scene portions 2–4, detectors D–F detect scene portions 6–8, and detectors G–I detect scene portions 10–12.

Figure 8:
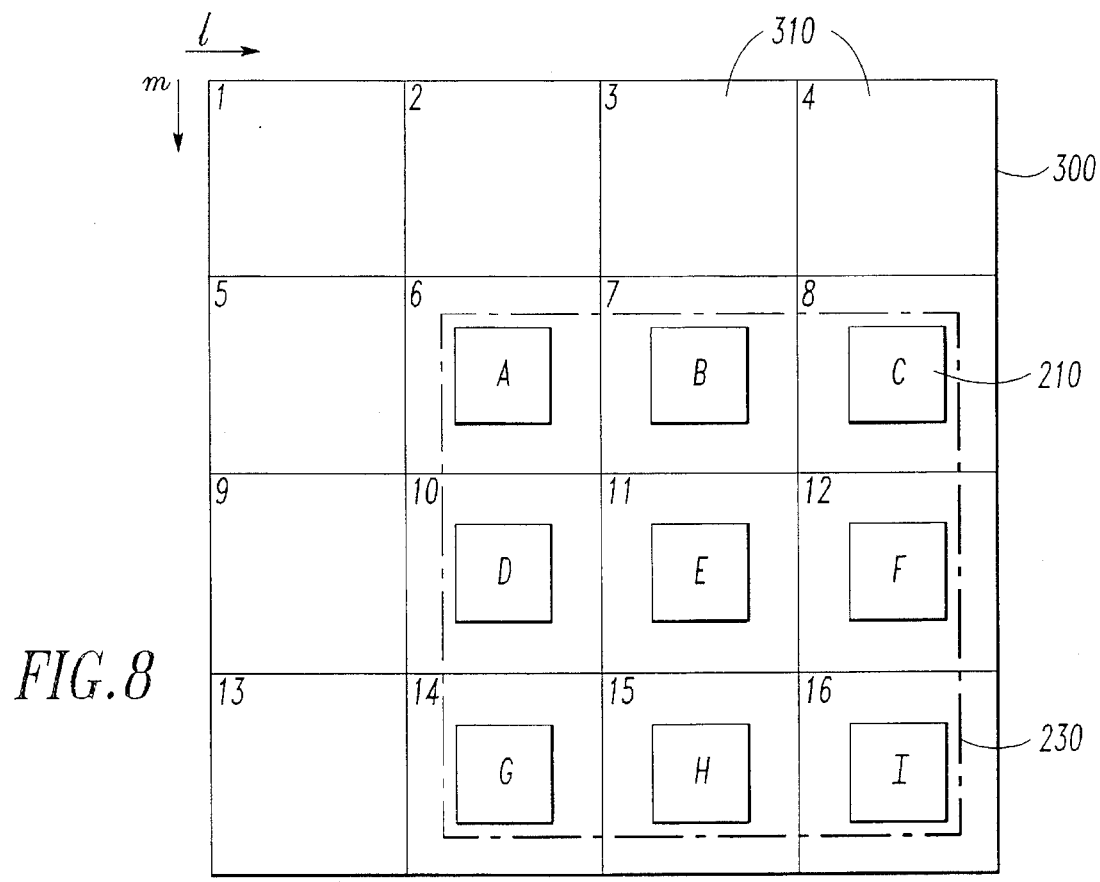
FIG. 8 shows the 3×3 detector array portion dithered to position 4 of the box scan pattern after the end of the third frame.

FIG. 8 shows the detector array portion 230 dithered to position 4 of the box scan pattern after the end of the third frame. During the fourth frame, detectors A–C detect scene portions 6–8, detectors D–F detect scene portions 10–12, and detectors G–I detect scene portions 14–16. After the end of the fourth frame, the detector array portion is dithered back to position 1 of the box scan pattern, and the pattern begins anew.

As can be seen from FIGS. 5–8, multiple detectors image the same location in the scene during different frames, providing detector overlay which can be used for offset correction of the detector signal. For example, scene portion 6 is imaged by detectors B (FIG. 5), E (FIG. 6), D (FIG. 7), and A (FIG. 8). Scene portion 11 is imaged by detectors F (FIG. 5), I (FIG. 6), H (FIG. 7), and E (FIG. 8).

In addition, as shown by FIGS. 5–8, multiple detectors traverse the same path between detectors (i.e. have common scan gradient paths). For example, the path from scene portion 6 to scene portion 10 is travelled by both detector D (FIGS. 7 and 8) and detector E (FIGS. 5 and 6). Because the absolute value of the change in intensity between the two scene portions is all that is important, it does not matter that the detectors traverse the path in different order (for example from 6 to 10 as opposed to from 10 to 6). The common scan gradients can be used for gain correction of the detector signal.

As mentioned previously, the gradients can be represented as the ratio of the signals produced by each detector traversing a common scan path. The gain correction term can be determined by averaging the signal ratios using Equation (9) described above. For example, to determine the gain correction term for detector E Ratio$_E$), the ratios of the detectors having common scan paths (detectors B, D, F and H) are averaged.

$$Ratio_E = (Ratio_{EB} + Ratio_{ED} + Ratio_{EF} + Ratio_{EH})/4$$

The gain of the digitized detector signal for detector E is then multiplied by the gain correction factor Gain$_E$ to provide the corrected gain component, using equation (11).

$$Gain_E = Ratio_E * Gain_E/(1+A)$$

To determine the offset correction term for Detector E (Diff$_E$), the signals from the neighboring detectors (detectors A, B and D) that image a common point in the scene with detector E are averaged, and subtracted from the detector signal for detector E, using equation (110).

$$Diff_E = S_E - (S_A' + SB' + S_D')/3$$

The offset correction factor Diff$_E$ is then added to the offset of the digitized detector signal for detector E to provide the corrected offset component, using equation (18).

$$Offset_E = Offset_E + Diff_E(1+B).$$

Figure 9:
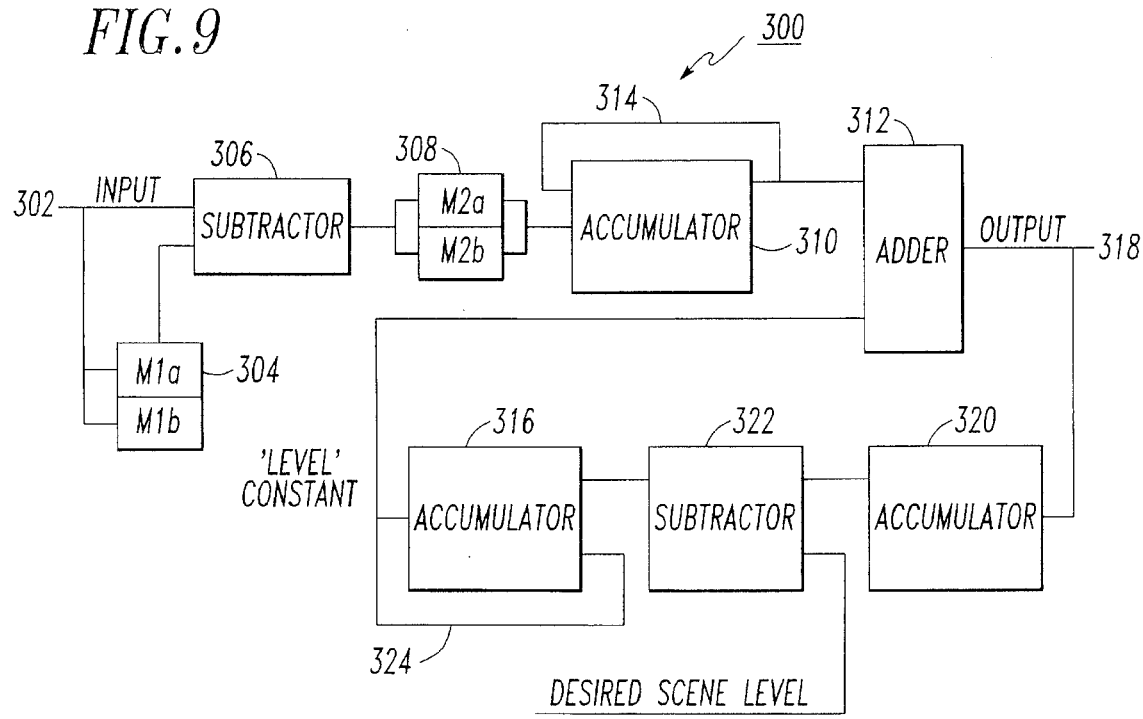
FIG. 9 is a more detailed illustration of a portion of the processing hardware used to implement the offset correction algorithms.

FIG. 9 is a more detailed illustration of a hardware implementation 300 of a portion of the processing hardware 70 (FIG. 1) used to implement the offset correction algorithms. Data from a current frame is received at input 302.

This data is stored in section M1b of memory 304 and also fed to one input of subtractor 306. Data from the previous frame is stored in section M1a of memory 304, and supplied to the other input of subtractor 306. Subtractor 306 then subtracts the previous frame data stored in section M1a from the data from the current frame data received from input 302 to form a difference image. Because the offsets in both frames are the same, they cancel each other in the subtraction and are not present in the difference image.

The difference image from subtractor 306 is then stored in section M2a of memory 308. While this image is being stored in section M2a, the difference image from the previous frame is read out from section M2b of memory 308 and fed to one input of accumulator 310. Accumulator 310 adds the data from each detector in the difference image to the data from the previous detectors in that image, and provides the output to adder 312. Feedback line 314 connects the output of accumulator 310 to the other input of accumulator 310, and is used to supply the summed data from the previous detectors of the difference image to the accumulator 310 so that accumulator 310 can add these values. The addition process performed by accumulator 310 reverses the subtraction process performed by subtractor 306, except that the offsets, which are absent from the difference image, do not contribute to the resulting sums. Thus, the output of accumulator 310 is the original image with the offset errors removed. At the end of each frame, the functions of memory sections M1a and M1b of memory 304 are reversed, and the functions of memory sections M2a and M2b of memory 308 are also reversed.

Because the accumulation process performed by accumulator 310 starts arbitrarily at one location in the image (typically the upper left hand corner), the output of the accumulator will not have the proper average level. In order to overcome this problem, accumulator 316 supplies a "level" constant to the second input of adder 312. Adder 312 adds this level constant to the output of accumulator 314 to produce an output on line 318 with the desired scene average level. In order to create the level constant, accumulator 320 receives the output on line 318, adds the data for all the detectors, and divides this sum by the total number of detectors. Subtractor 322 then compares the output of accumulator 320 with the desired scene level, and outputs the difference to one input of accumulator 316. Accumulator 316 adds the difference from subtractor 322 to the current level constant obtained from feedback line 324 to obtain the level constant for the next frame.

Figure 10:
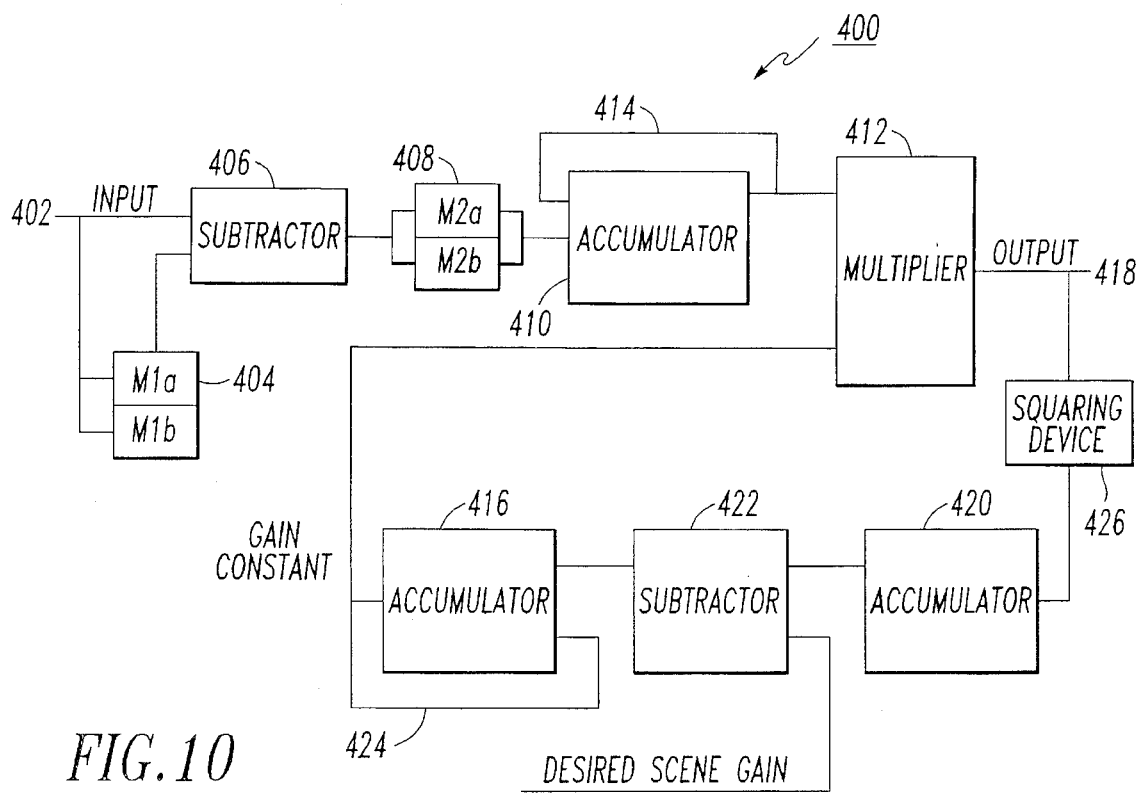
FIG. 10 is a more detailed illustration of a portion of the processing hardware used to implement the gain correction algorithms.

FIG. 10 illustrates a hardware implementation 400 of a portion of the processing hardware 70 (FIG. 1) used to implement the gain correction algorithms. This implementation is similar to the offset correction hardware shown in FIG. 9. In FIG. 10, data from a current frame is received at input 402. This data represents the average change in the scene in the current frame from the previous frame. Data at input 402 is fed to an input of subtractor 406 and stored in section M1b of memory 404. Data representing the average change in the previous frame from the frame before it is stored in section M1a of memory 404, and is supplied to the other input of subtractor 406. Subtractor 406 subtracts the data stored in M1a from the data from the current frame to form a difference image representing the differences in average change between the two frames. Because the gain errors in both frames are the same, they cancel each other in the subtractor and are not present in the difference image.

The difference image from subtractor 406 is then stored in section M2a of memory 408. While this image is being stored in section M2a, the difference image from the previous frame is read out from section M2b of memory 308 and fed to one input of accumulator 410. Accumulator 410 adds the data from each detector in the difference image to the data from the previous detectors in that image, and provides the output to multiplier 412. Feedback line 414 connects the output of accumulator 410 to the other input of accumulator 410, and is used to supply the summed data from the previous detectors of the difference image to the accumulator 410 so that accumulator 410 can add these values. The addition process performed by accumulator 410 reverses the subtraction process performed by subtractor 406, except that the gain errors, which are absent from the difference image, do not contribute to the resulting sums. Thus, the output of accumulator 410 is the original image with the gain errors removed. At the end of each frame, the functions of memory sections M1a and M1b of memory 404 and of memory sections M2a and M2b of memory 408 are reversed.

Because the accumulation process performed by accumulator 410 starts arbitrarily at one location in the image (typically the upper left hand corner), the output of the accumulator will not have the proper average gain. In order to overcome this problem, accumulator 416 supplies a gain constant to the second input of multiplier 412. Multiplier 412 multiplies this gain constant to the output of accumulator 414 to produce an output on line 418 with the desired average gain. In order to create the gain constant, the output on line 418 is squared by squaring device 426 and supplied to accumulator 420. Accumulator 420 adds the squared data for all the detectors, and divides this sum by the total number of detectors. Subtractor 422 then compares the output of accumulator 420 with the desired scene gain, and outputs the difference to one input of accumulator 416. Accumulator 416 adds the difference from subtractor 422 to the current gain constant obtained from feedback line 424 to obtain the gain level constant for the next frame.

Figure 11:
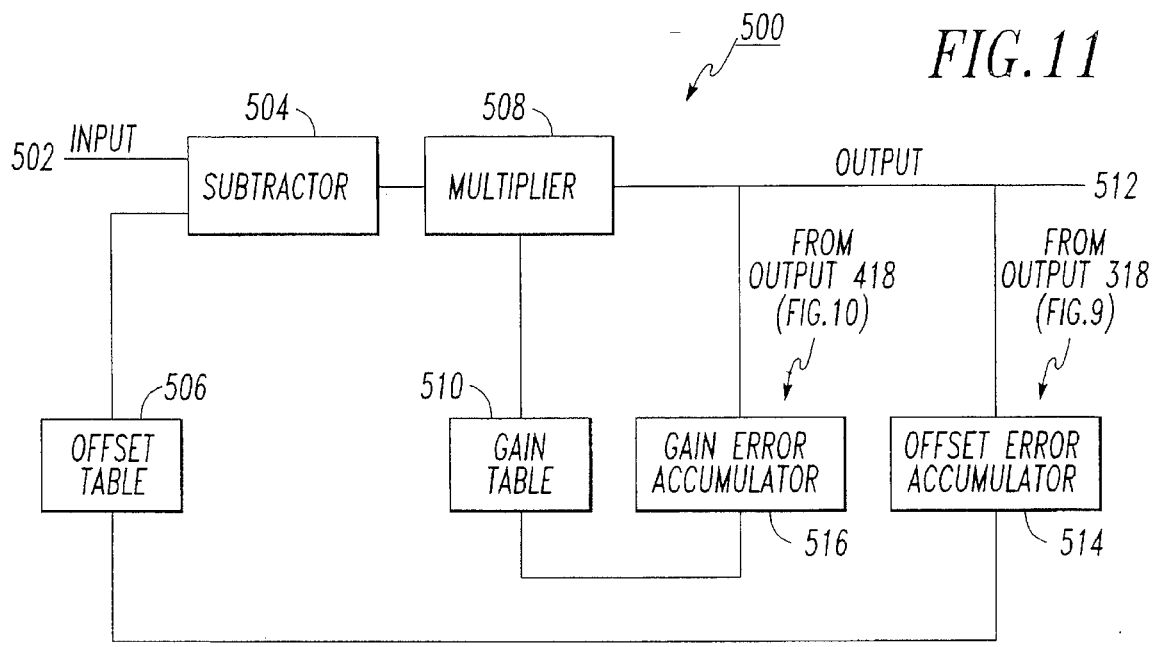
FIG. 11 shows a feedback loop than can be implemented in the processing hardware to further reduce gain and offset errors.

FIG. 11 shows a feedback loop 500 than can also be implemented in processing hardware 70 to further reduce gain and offset errors. Feedback loop 500 is placed before offset processing hardware 300 and gain processing hardware 400. Input 502 receives digital data for the current frame from A/D converter 60 (FIG. 1). This data is fed to one input of subtractor 504. An offset correction value from offset table 506 is fed to the other input of subtractor 504, and subtractor 504 corrects offset errors in the data input at 502 using this offset correction value. The output from subtractor 504 is then fed to multiplier 508. Multiplier 508 corrects the gain of the frame data based on a gain correction value received from gain table 510. The corrected frame data is then output on line 512. The frame data output on line 512 is supplied to offset processing hardware 300 and gain processing hardware 400.

In order to form the offset feedback loop, the output signal at output 512 is fed to one input of offset error accumulator 514. The other input to offset error accumulator 514 is obtained from output 318 of the offset processing hardware of FIG. 9. Offset error accumulator calculates the difference between the signals at output 318 and output 512, and adds this difference to the offset correction value stored in offset table 506 to form a new offset correction value for the next frame. Similarly, gain error accumulator 516 calculates the difference between the signals at output 418 (FIG. 10) and output 512, and adds this difference to the gain correction value stored in gain table 510 to form a new gain correction value for the next frame. As a result of this feedback, the offset and gain errors for the subsequent frame will be smaller, and the errors converge to zero.

When the detector array 20 is installed in a moving platform, the intensity of each point in the scene may not remain constant during a cycle of the dither pattern. If the gain and offset corrections are small compared to the scene variance, then the errors caused by ignoring scene changes can be significant. In order to compensate for scene dynamics, the presently preferred embodiment of the invention can include a method and apparatus for compensating for scene dynamics and limiting the effect of scene changes on the detector correction process.

Figure 12:
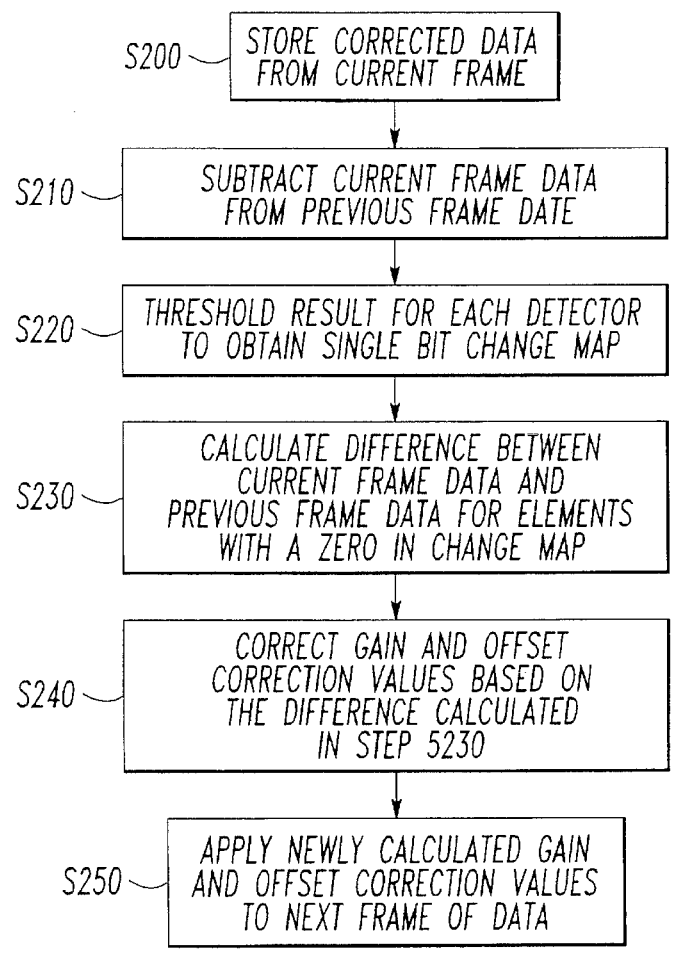
FIG. 12 is a flow chart illustrating the method for compensating for scene dynamics used in the preferred embodiment of the invention.

FIG. 12 is a flow chart illustrating the steps of the method for compensating for scene dynamics used in the preferred embodiment of the dither scanning method. In step S200, the corrected data from the current frame for use in change detection is stored. In step S210 the current frame data is subtracted from the previous frame data. In step S220 the result obtained in step S210 is thresholded for each detector to obtain a single bit change map. The change map is a table of binary storage locations with each entry corresponding to a particular detector in the detector array. The change map is used to decide whether there is a change of scene intensity from one frame to the next that is larger than a predetermined threshold. If the change for a particular detector exceeds the threshold, a one is placed in the portion of the change map corresponding to that detector. If the change is less than the threshold, a zero is placed in the portion of the change map corresponding to that detector. In step S230, for elements with a zero in the change map, the difference between the current sample and the sample from the last frame is calculated using the processing hardware of FIG. 11. In step S240, the offset and gain correction values stored in the offset table and gain table are adjusted based on the difference obtained in step S230 to form new offset and gain correction values. In step S250, the new offset and gain correction values are applied to the next frame of data as it is collected.

The effect of scene changes on the dither scan detector compensation can also be reduced by reducing the cycle time of the dither scan pattern, either by reducing the frame time, or by reducing the number of frames in the scan cycle, or both.

It will be apparent to those skilled in the art that various modifications and variations can be made in the dither scan detector compensation method and apparatus of the present invention without departing from the spirit or scope of the invention. Thus, it is intended that the present invention cover the modifications and variations of this invention provided they come within the scope of the appended claims and their equivalents.

What is claimed is:

1. A dither scan detector compensation apparatus comprising:

means for sensing images in a scene using an array of individual detectors and generating output signals from the detectors corresponding to portions of the scene observed;

means for dithering the sensing means according to a dither pattern, the dither pattern allowing for detector overlap and common scan paths;

means for correcting gain and offset errors in the output signals from the individual detectors resulting from variations in gain and offset from detector to detector in the detector array based on signals resulting from the detector overlap and the common scan paths provided by the dither pattern;

means for correcting global gain errors common to all the individual detectors in the detector array; and means for correcting global offset errors common to all the individual detectors in the detector array.

2. The apparatus of claim 1, wherein the correcting means further comprises:

means for determining gain corrections for correcting the gain variations from detector to detector based on signals resulting from the common scan paths provided by the dither pattern;

means for applying the gain corrections to the output signals from the individual detectors.

3. The apparatus of claim 1, wherein the correcting means further comprises:

means for determining offset corrections for correcting the offset variations from detector to detector based on detector signals overlaid in the detector pattern; and means for applying the offset corrections to the output signals from the individual detectors.

4. The apparatus of claim 1, further comprising digitizing means for converting the output signals generated by the sensing means from analog to digital form.

5. The apparatus of claim 1, wherein said gain and offset correcting means includes memory means for storing the detector signals after gain and offset errors have been corrected.

6. The apparatus of claim 1, wherein said dither pattern is a four point square pattern.

7. The apparatus of claim 2, wherein the correcting means further comprises:

means for determining offset corrections for correcting the offset variations from detector to detector based on detector signals overlaid in the detector pattern; and means for applying the offset corrections to the output signals from the individual detectors.

8. The apparatus of claim 7, further comprising:

means for subtracting current frame data from previous frame data;

means for comparing the result of the subtracting step to a predetermined threshold;

a change map having an entry for each individual detector in the detector array;

means for storing in each entry of the change map a first value if the output of the subtracting means exceeds the predetermined threshold, and a second value if the output of the subtracting means does not exceed the predetermined threshold;

means for adjusting the gain and offset correction values only for detectors corresponding to entries in the change map having the second value.

9. A method for dither scanning a scene using an array of detectors in order to compensate for gain and offset errors in the detector array, comprising the steps of:

sensing images in a scene using the detector array and generating output signals from the detectors corresponding to portions of the scene observed;

dithering the detector array according to a dither pattern, the dither pattern allowing for detector overlap and common scan paths among individual detectors in the detector array;

correcting gain and offset errors resulting from variations in gain and offset from detector to detector in the detector array based on signals resulting from the detector overlap and the common scan paths provided by the dither pattern;

correcting global gain errors common to all the individual detectors in the detector array; and correcting global offset errors common to all the individual detectors in the detector array.

10. The method of claim 9, wherein the correcting step further comprises:

determining gain corrections for correcting the gain variations from detector to detector based on signals resulting from the common scan paths provided by the dither pattern;

applying the gain corrections to the output signals from the individual detectors.

11. The method of claim 9, wherein the correcting step further comprises:

determining offset corrections for correcting the offset variations from detector to detector based on detector signals overlaid in the detector pattern; and applying the offset corrections to the output signals from the individual detectors.

12. The method of claim 9, further comprising the step of:

converting the output signals generated by the sensing means from analog to digital form.

13. The method of claim 9, wherein said gain and offset correcting step includes the step of storing the detector signals in a memory after gain and offset errors have been corrected.

14. The method of claim 9, wherein said dither pattern is a four point square pattern.

15. The method of claim 10, wherein the correcting step further comprises the steps of:

determining offset corrections for correcting the offset variations from detector to detector based on detector signals overlaid in the detector pattern; and applying the offset corrections to the output signals from the individual detectors.

16. A dither scan detector compensation apparatus for compensating for variations in gain and offset from detector to detector in a detector array, comprising:

a detector array having a plurality of individual detectors that sense images in a scene and generate output signals corresponding to portions of the scene observed by the detector array;

a dithering apparatus that dithers the detector array by moving the detector line of sight between consecutive frames according to a predetermined dither pattern;

an A/D converter that digitizes the output signals from the individual detectors;

a gain corrector that applies a gain correction factor to the digitized output signals from the individual detectors;

an offset corrector that applies an offset correction factor to the digitized output signals from the individual detectors;

a memory that stores the digitized output signals after gain and offset correction by the gain corrector and offset corrector for a plurality of frames of the dither pattern;

a gain correction processor that receives detector data from the memory and calculates the gain correction factor based upon that data;

an offset correction processor that receives detector data from the memory and calculates the offset correction factor based upon that data;

a global gain corrector that corrects global gain errors common to all the individual detectors in the detector array; and a global offset corrector that corrects global offset errors common to all the individual detectors in the detector array.

17. The apparatus of claim 16, further comprising:

an image formatter for converting the corrected detector data stored in the memory in proper format for display and outputting the converted data; and a display for displaying the data output from the image formatter.

* * * * *